United States Patent [19]
Ataka et al.

[11] Patent Number: 6,037,069
[45] Date of Patent: Mar. 14, 2000

[54] MAGNETIC RECORDING MEDIUM

[75] Inventors: Toyoji Ataka; Keiji Okubo; Masashi Kanamori, all of Nagano, Japan

[73] Assignee: Fuji Electric Co., Ltd., Japan

[21] Appl. No.: 08/656,872

[22] Filed: May 30, 1996

[30] Foreign Application Priority Data

May 30, 1995 [JP] Japan .................. PA 7-131367

[51] Int. Cl.⁷ .................................................. G11B 5/66
[52] U.S. Cl. ................................................ 428/694 TS
[58] Field of Search .................. 428/65.3, 65.5, 428/65.7, 336, 666, 667, 694 T, 694 TS, 694 TP, 694 TM, 900, 332, 212

[56] References Cited

U.S. PATENT DOCUMENTS

| | | | |
|---|---|---|---|
| 4,652,499 | 3/1987 | Howard | 428/641 |
| 4,654,276 | 3/1987 | Ahlert et al. | 428/641 |
| 4,784,895 | 11/1988 | Mizuno et al. | 428/212 |
| 5,143,794 | 9/1992 | Suzuki et al. | 428/611 |
| 5,298,324 | 3/1994 | Ivett et al. | 428/336 |
| 5,314,745 | 5/1994 | Okumura | 428/336 |
| 5,326,637 | 7/1994 | Nasu | 428/336 |
| 5,413,868 | 5/1995 | Matsubaguchi et al. | 428/457 |
| 5,552,217 | 9/1996 | Yamaguchi et al. | 428/332 |
| 5,607,740 | 3/1997 | Noda | 428/65.3 |
| 5,700,593 | 12/1997 | Okumura et al. | 428/694 TS |

FOREIGN PATENT DOCUMENTS 4-321919  11/1992  Japan .

*Primary Examiner*—Mary E. Mosher
*Attorney, Agent, or Firm*—Rossi & Associates

[57] ABSTRACT

A magnetic recording medium has a non-magnetic metal base layer formed on a non-magnetic base and supporting a magnetic layer thereon. The non-magnetic metal base layer includes two or more base layers including at least one first base layer each having an anisotropic magnetic characteristic in which a coercive force in a circumferential direction of the magnetic recording medium is higher than a coercive force in a radial direction of the medium, and at least one second base layer each having an anisotropic magnetic characteristic in which the coercive force in the circumferential direction is lower than the coercive force in the radial direction.

2 Claims, 1 Drawing Sheet

MAGNETIC RECORDING MEDIUM

FIELD OF THE INVENTION

The present invention relates to a magnetic recording medium, such as a magnetic disc, for use with a fixed magnetic disc device, for example, and more particularly to the structure and material of a base layer supporting a magnetic layer of the magnetic recording medium.

BACKGROUND OF THE INVENTION

A known magnetic disc (magnetic recording medium) to be used with a fixed magnetic disc device has a cross sectional structure as shown in FIG. 2. Specifically, a non-magnetic layer 2 made of Ni—P or Al, for example, is formed on a non-magnetic substrate 1 made of Al or glass, for example, to provide a non-magnetic base 11. A non-magnetic metal base layer 3, a hard magnetic layer 4 as described later, and a protecting layer 5 consisting essentially of C are successively laminated on the non-magnetic base 11, and a lubrication layer 6 is further formed on the protective layer 5. The hard magnetic layer 4 is made of CoCrTa or CoCrPtTa, for example, and has a coercive force (Hc) of 1600 Oe or higher.

To produce the magnetic disc as described above, the non-magnetic substrate 1 made of an aluminum alloy or a glass material or the like is finished with desired parallelism, flatness and surface roughness, and the non-magnetic layer 2 consisting of an Ni—P or Al film is formed on a major surface of the non-magnetic substrate 1 in a wet film-forming process, such as electroless plating, or a dry process, such as sputtering or deposition. The non-magnetic base 11 is heated to 150–200° C., and the non-magnetic metal base layer 3, hard magnetic layer 4 and protective layer 5 are successively formed on the surface of the base 11 by a continuous sputtering method, while a dc bias of about 350V is applied to the base 11. The non-magnetic metal base layer 3 thus formed is made of Cr and has a film thickness of about 50 nm, and the hard magnetic layer 4 is made of a material, such as CoCrTa, which contains Co as a major component, and has a film thickness of about 30 nm, while the protective layer 5 contains C as a major component, and has a film thickness of about 10 nm. The protective layer 5 is then coated with a liquid lubricant containing fluorocarbon, which provides the lubrication layer 6 having a thickness of about 1 nm. The magnetic disc thus produced exhibits excellent mechanical characteristics, such as high strength and dimensional accuracy, without causing any problem when actually used, and also exhibits excellent magnetic characteristics. More specifically, the coercive force Hc is about 2000 Oe, and the product (Br.t) of the residual magnetic flux density (Br) and thickness t of the disc is about 150 G$\mu$m. Further, the gradient (coercive force angle ratio S*) of the magnetic curve near the coercive force Hc is favorably about 0.93.

It is also proposed to use an alloy film as a base layer 3, which contains Cr as a major component, and Ti, V or the like, instead of the above-described base layer 3 made of Cr. This base layer 3 has a further increased coercive force Hc.

The magnetic recording medium is required to have a sufficiently high coercive force so as to achieve an increased rack recording density. In this connection, a magnetic recording disc having isotropic magnetic characteristics in which the coercive force in the circumferential direction of the disc is equal to the coercive force in the radial direction was evaluated in terms of its electromagnetic conversion characteristics, and relevant calculation proved that such a recording medium generates reduced noise, as reported in IEEE Trans. Magn. 29, ('93) 324. In this regard, it has been revealed that the base layer 3, when formed from a Cr film or an alloy film containing V or Ti as well as Cr as a major component, has a high coercive force Hc, but exhibits conspicuous anisotropic magnetic characteristics in which the coercive force in the circumferential direction of the disc is higher than that in the radial direction. Accordingly, undesirably large noise is generated by the recording medium having the non-magnetic metal base layer 3 in the form of the Cr film or alloy film as described above.

SUMMARY OF THE INVENTION

It is therefore an object of the present invention to provide a magnetic recording medium which exhibits isotropic magnetic characteristics, by correcting the magnetic anisotropy, while maintaining a sufficiently high coercive force, so as to achieve a high track recording density and reduced noise.

The above object may be accomplished according to one aspect of the present invention, which provides a magnetic recording medium comprising a non-magnetic base; a non-magnetic metal base layer formed on the non-magnetic base; a magnetic layer formed on the non-magnetic metal base layer; and a protective layer formed on the magnetic layer, wherein the non-magnetic metal base layer has a plural-layer structure comprising at least one first base layer each having an anisotropic magnetic characteristic in which a coercive force in a circumferential direction of the magnetic recording medium is higher than a coercive force in a radial direction of the recording medium, and at least one second base layer each having an anisotropic magnetic characteristic in which the coercive force in the circumferential direction is lower than the coercive force in the radial direction.

In one preferred form of the present invention, the non-magnetic metal base layer has a two-layer structure comprising one first base layer and one second base layer. In this case, the first base layer may consist of a Cr layer, and the second base layer may consist of an alloy layer containing Cr as a major component. To the contrary, the first base layer may be a Cr alloy layer, and the second base layer may be a Cr layer. The alloy layer containing Cr as a major component may further contain Ta.

A magnetic recording medium including a non-magnetic metal base layer in the form of a single Cr layer or a single alloy layer containing Cr as a major component and Ti, for example, has an anisotropic magnetic characteristic in which the coercive force in the circumferential direction of the recording medium is higher than the coercive force in the radial direction. In the meantime, the inventors of the present invention found that a magnetic recording medium using a single alloy layer containing Cr as a major component and Ta has a reverse anisotropic magnetic characteristic with respect to the above-described medium, namely, the circumferential coercive force is lower than the radial coercive force (direction ratio=circumferential coercive force/ radial coercive force<1). It was then revealed that if a base layer having an anisotropic magnetic characteristic in which the circumferential coercive force is higher than the radial coercive force is superposed on another base layer having a reverse anisotropic magnetic characteristic in which the circumferential coercive force is lower than the radial coercive force, the two different anisotropic magnetic characteristics are offset by each other, so that the resulting recording medium shows relatively isotropic magnetic characteristics. Therefore, the noise generated by the recording medium can be reduced if its non-magnetic metal base layer has such a plural-layer structure as described above. It was also confirmed that the non-magnetic metal base layer as a whole has a higher coercive force than those of the individual base layers that constitute the metal base layer. It was also presumed that the direction ratio as indicated above may be controlled to be not larger than 1, depending upon the kind and content of an element, such as Ta, to be added to the relevant base layer, and the ratio of the thickness of the first base layer to that of the second base layer, for example.

The above object may be also accomplished according to another aspect of the present invention, which provides a magnetic recording medium comprising: a non-magnetic base; a non-magnetic metal base layer formed on the non-magnetic base, the non-magnetic metal base layer having a two-layer structure comprising a Cr layer, and a Cr alloy layer containing W; a magnetic layer formed on the non-magnetic metal base layer; and a protective layer formed on the magnetic layer.

In the magnetic recording medium as described above, the non-magnetic metal base layer has a two-layer structure comprising a Cr layer and a Cr alloy layer containing W. The recording medium having such a non-magnetic metal base layer has a high coercive force and a reduced degree of magnetic anisotropy.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENT

There will be described in detail a preferred embodiment of the present invention, referring to the accompanying drawings.

EXAMPLE 1

Figure 1:
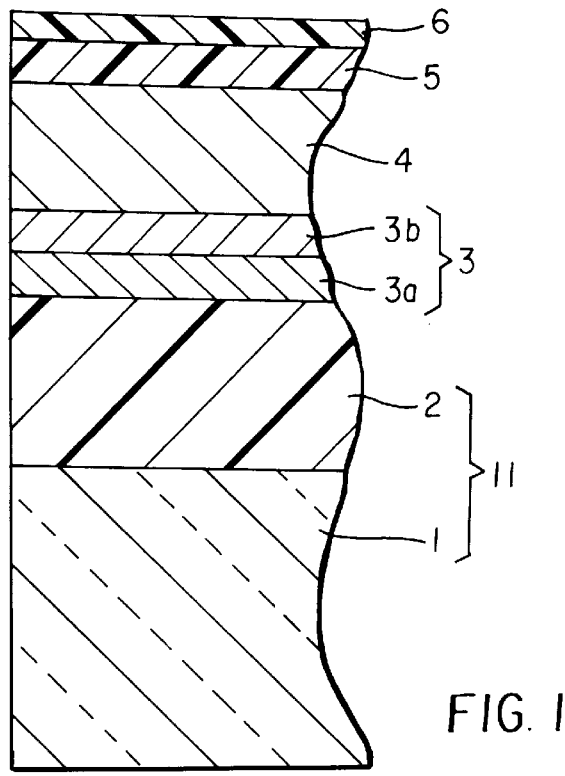
FIG. 1 is a schematic cross sectional view showing a cross sectional structure of a magnetic disc constructed according to one preferred embodiment of the present invention.

FIG. 1 is a schematic cross sectional view showing a cross sectional structure of a magnetic disc constructed according to one referred embodiment of the present invention.

To produce Example 1 of the magnetic disc according to the present embodiment, the magnetic disc of the present embodiment, a non-magnetic layer 2 consisting of a 10 μm-thickness NiP film was formed by electroless plating on a surface of a non-magnetic substrate 1 formed of an Al alloy or a glass material and finished with desired parallelism, flatness and surface roughness, to thus provide a non-magnetic base 11. A carrier on which the non-magnetic base 11 was mounted was continuously fed through a furnace in which four kinds of targets, i.e., Cr, Cr alloy containing Ta, Co alloy and C were arranged in this order, so that a 50 nm-thickness non-magnetic metal base layer 3, a hard magnetic layer 4 having a thickness of about 30 nm and formed of a Co alloy, and a protective layer 5 having a thickness of about 10 nm and formed of amorphous carbon (a-C) were successively formed by sputtering on the base 11. This sputtering process was effected under ultimate vacuum: $1.0 \times 10^{-4}$ Pa or lower, after heating the substrate at about 300° C. for 15 min., using an Ar gas whose pressure was 5 Pa during the film formation, such that Cr and Cr alloy were applied at a rate of 0.1–0.7 nm/s, and the Co alloy was applied at a rate of about 0.2 nm/s, while C was applied at a rate of about 0.1 nm/s, with the substrate being biased to −100V.

As shown in FIG. 1, the non-magnetic metal base layer 3 of Example 1 had a two-layer structure, namely, consisted of a first base layer 3a in the form of a pure Cr film formed by sputtering Cr, and a second base layer 3b formed by sputtering a Cr alloy containing 4 at. % of Ta. The thickness of the first base layer 3a was made equal to that of the second base layer 3b.

EXAMPLE 2

A magnetic disc was produced in the same manner as in Example 1 above, except that the second base layer 3b was formed by using a Cr alloy containing 6 at. % of W as a target, instead of the Cr alloy containing Ta as used in Example 1. In this example, too, the thickness of the first base layer 3a was made equal to that of the second base layer 3b.

COMPARATIVE EXAMPLES

Figure 2:
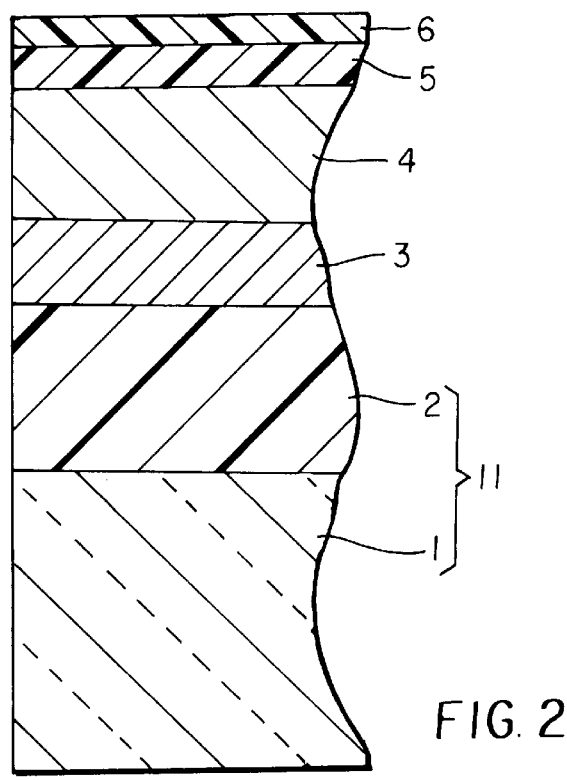
FIG. 2 is a schematic cross sectional view showing a cross sectional structure of a generally known magnetic disc.

To evaluate the above examples of the present invention, three kinds of magnetic discs having respective non-magnetic metal base layers 3 as indicated in FIG. 2 were prepared as comparative examples. The non-magnetic metal base layer 3 of Comparative Example 1 was formed of pure Cr, and that of Comparative Example 2 was formed of a Cr alloy containing 6 at. % of W, while the non-magnetic metal base layer 3 of Comparative Example 3 was formed of a Cr alloy containing 4 at. % of Ta.

Table 1 shows magnetic characteristics of Examples 1, 2 and comparative examples.

TABLE 1

| | Metal base layer 3 | Hc | Br · t | Bs · t | S | S* | O.R. |
|---|---|---|---|---|---|---|---|
| Ex. 1 | Cr/Cr-Ta | 1875 | 318 | 350 | 0.91 | 0.93 | 1.39 |
| Ex. 2 | Cr/Cr-W | 1903 | 340 | 368 | 0.92 | 0.93 | 1.44 |
| Com. Ex. 1 | Cr | 1780 | 307 | 334 | 0.92 | 0.92 | 1.51 |
| Com. Ex. 2 | Cr-W | 1868 | 334 | 377 | 0.91 | 0.93 | 1.62 |
| Com. Ex. 3 | Cr-Ta | 1565 | 232 | 304 | 0.76 | 0.60 | 0.89 |

In the above TABLE 1, Hc (Oe) is coercive force in the circumferential direction of the recording medium (disc), Br.t (Gμm) is product of the residual magnetic flux density and thickness of the magnetic layer, Bs.t(Gμm) is product of the saturated magnetic flux density and thickness of the magnetic layer, S is angle ratio, S* is angle ratio of the coercive force, and O.R. is direction ratio (Hc/Hc') of the coercive force Hc in the circumferential direction to the coercive force Hc' in the radial direction of the medium.

As indicated in TABLE 1, the magnetic recording medium of Comparative Example 1 having the non-magnetic metal base layer 3 consisting of a single Cr layer has a coercive force Hc of 1780 Oe in the circumferential direction, and the direction ratio O.R. of the coercive force Hc to the coercive force Hc' in the radial direction is 1.51. The magnetic recording medium of Comparative Example 2 having the non-magnetic metal base layer 3 formed of a Cr alloy containing 6 at. % of W has a coercive force Hc that is higher by about 100 Oe than that of Comparative Example 1 using the single Cr layer. The directional ratio O.R. of Comparative Example 2 is 1.62, which means that the magnetic anisotropy of this recording medium is stronger than that of Comparative Example 1. While the recording medium of Comparative Example 3 having the non-magnetic metal base layer 3 formed of a Cr alloy containing 4 at. % of Ta has a reduced coercive force Hc, the direction ratio O.R. is smaller than 1, which means that the magnetic anisotropy of this recording medium is the reverse of those of Comparative Examples 1 and 2, that is, the radial coercive force Hc' is larger than the circumferential coercive force Hc.

The magnetic recording medium of Example 1 has a coercive force Hc of 1875 Oe, which is higher than that (1780 Oe) of the medium having only the Cr layer which forms the first base layer 3a of Example 1, and also higher than that (1565 Oe) of the medium having only the Cr alloy layer containing 4 at. % of Ta which forms the second base layer 3b of Example 1. The recording medium of Example 1 exhibits not only a high coercive force, but a reduced directional ratio O.R. of 1.39, that is, a reduced degree of anisotropy (or a higher degree of isotropy) in its magnetic characteristics. More specifically, the non-magnetic metal base layer 3 of the recording medium of Example 1 consists of the first base layer 3a in the form of a Cr film in which the circumferential coercive force is higher than the radial coercive force, and the second base layer 3b formed of a Cr alloy containing Ta, in which the circumferential coercive force is lower than the radial coercive force. In this arrangement, the magnetic anisotropy of the first base layer 3a is offset or alleviated by that of the second base layer 3b, whereby the resultant metal base layer 3 exhibits more isotropic magnetic characteristics, which lead to reduced noise generated by the medium. Further, the level of the coercive force of the present recording medium is increased to be higher than those having only the Cr layer or the Cr-Ta layer, to achieve an increased track recording density.

Thus, the magnetic recording medium of Example 1 has a relatively high track recording density, and generates relatively low noise. While the thickness of the first base layer 3a is equal to that of the second base layer 3b in Example 1, these layers 3a, 3b may have different thicknesses, to further reduce the direction ratio. The direction ratio and coercive force can be also controlled to desired levels by changing kinds and contents of elements, such as Ta, which are added to the base layers.

The magnetic isotropy of the recording medium can be actually improved by optimizing the level of voltage for biasing the substrate during the film formation, so as to further increase the coercive force of the medium.

The magnetic recording medium of Example 2 has a coercive force Hc of 1903 Oe, which indicates that the medium is highly magnetized, and also has a direction ratio O.R. of 1.44, which indicates the medium has a relatively low degree of magnetic anisotropy. In Example 2, the second base layer 3b is formed of a Cr alloy containing 6 at. % of W. As is apparent from Comparative Example 2, the medium having the non-magnetic metal base layer 3 consisting solely of a Cr alloy layer containing 6 at. % of W has a direction ratio O.R. of not less than 1. However, the degree of the magnetic isotropy of the medium of Example 2 is significantly increased or improved for some reason.

It is suggested that a magnetic recording medium, which includes a non-magnetic metal base layer having a three-layer structure that consists of a Cr layer, a Cr alloy layer containing W, and a Cr alloy layer containing Ta, have a high coercive force and isotropic magnetic characteristics.

As explained above, the present invention is characterized in that the non-magnetic metal base layer has a plural-layer structure which is a combination of at least one base layer having the magnetic anisotropy in which the coercive force in the circumferential direction of the medium is higher than that in the radial direction, and at least one base layer having the magnetic anisotropy in which the coercive force in the circumferential direction is lower than that in the radial direction. This arrangement yields the following effects.

When a base layer that causes the magnetic anisotropy in which the circumferential coercive force is higher than the radial coercive force is superposed on another base layer than causes the magnetic anisotropy in which the circumferential coercive force is lower than the radial coercive force, to provide the non-magnetic base layer of the recording medium, the two kinds of anisotropic magnetic characteristics are offset by each other toward the magnetic isotropy, and the noise generated by the medium is accordingly reduced. Further, the non-magnetic metal base layer as a whole has a higher coercive force than those of the individual base layers that constitute the metal base layer, to thus achieve a sufficiently high track recording density.

In one preferred form of the present invention, the non-magnetic metal base layer has a two-layer structure consisting of a Cr layer and a Cr alloy layer containing W. In this case, too, the resulting magnetic recording medium has a high coercive force, a high track recording density, and a reduced degree of magnetic anisotropy, and the noise generated by this medium is reduced.

What is claimed is:

1. A magnetic recording medium comprising:
   a non-magnetic base; and
   a non-magnetic metal base layer on said non-magnetic base and a magnetic layer consisting of a cobalt alloy on said non-magnetic metal base layer successively formed by a continuous sputtering method;
   wherein said non-magnetic metal base layer consists of a first base layer and a second base layer formed on said first base layer, said first base layer consisting of a metallic Cr and said second base layer consisting of a Ta-containing Cr alloy.

2. A magnetic recording medium comprising:
   a non-magnetic base; and
   a non-magnetic metal base layer on said non-magnetic base and a magnetic layer consisting of a cobalt alloy on said non-magnetic metal base layer successively formed by a continuous sputtering method;
   wherein said non-magnetic metal base layer consists of a first base layer and a second base layer formed on said first base layer, said first base layer consisting of a metallic Cr and said second base layer consisting of a W-containing Cr alloy.

* * * * *